United States Patent [19]

Kiniwa

[11] Patent Number: 4,785,021
[45] Date of Patent: Nov. 15, 1988

[54] ADSORBENT AND METHOD OF PREPARATION

[75] Inventor: Hideaki Kiniwa, Yokohama, Japan

[73] Assignees: Research Development Corp. of Japan; Mitsubishi Kasei Corporation, both of Tokyo, Japan

[21] Appl. No.: 152,444

[22] Filed: Feb. 5, 1988

Related U.S. Application Data

[62] Division of Ser. No. 26,970, Mar. 17, 1987.

[30] Foreign Application Priority Data

Mar. 10, 1984 [JP] Japan ............................. 59-44065
Jul. 13, 1984 [JP] Japan ............................. 59-144372

[51] Int. Cl.$^4$ .............................. C08J 9/40; G08J 9/42
[52] U.S. Cl. ................................. 521/53; 428/304.4; 428/476.3; 521/54; 521/135; 521/139; 525/178; 525/183; 525/420
[58] Field of Search ............... 521/53, 54, 135, 139; 428/304.4, 476.3; 525/178, 183

[56] References Cited

U.S. PATENT DOCUMENTS

| | | | |
|---|---|---|---|
| 3,948,863 | 4/1976 | Akamatsu et al. | 210/38 B |
| 3,966,839 | 6/1976 | Sims | 210/635 |
| 4,105,709 | 8/1978 | Iwami et al. | 525/178 |
| 4,469,875 | 9/1984 | Busker et al. | 210/656 |
| 4,511,475 | 4/1985 | Yuki et al. | 210/635 |
| 4,694,044 | 9/1987 | Kiniwa | 524/606 |
| 4,747,956 | 5/1988 | Kiniwa | 210/679 |

Primary Examiner—Morton Foelak
Attorney, Agent, or Firm—Stephen F. K. Yee

[57] ABSTRACT

A method of adsorbing a substance such as an optically active substance, comprising contacting a solution of the substance in a solvent with an adsorbent consisting of a cross-linked polymer comprising an optically active, synthetic poly(amino acid) represented by the general formula (I):

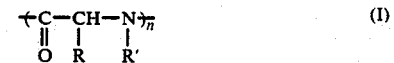

(I)

wherein R stands for an organic group, R' stands for hydrogen or an alkyl group and n is an integer of at least 5, which may be protected at a terminal amino group and a carrier polymer supporting said synthetic poly(amino acid) thereon, said carrier polymer having affinity for said solvent. A method for producing the cross-linked polymer is also described.

The adsorbent is especially useful for optical resolution of racemic mixtures.

3 Claims, 4 Drawing Sheets

ADSORBENT AND METHOD OF PREPARATION

This application is a division, of application Ser. No. 026,970, filed Mar. 17, 1987.

This invention relates to a method of adsorbing substances such as optically active substances with a cross-linked polymeric material.

The optical resolution, namely, the resolution of a racemic mixture into optical antipodes is an extremely important technology in pharmaceutical, agricultural and food industries. According to ordinary procedures, a racemic mixture is converted into a mixture of diastroisomers, which is then separated on the basis of a difference in physical properties. However, the kinds of racemic mixtures which are separable by this method are limited.

In addition to the above-mentioned ordinary method, many studies have been recently actively made on the technology of resolving racemic mixtures by chromatography. In this regard, there is a proposed method in which a filler of an optically active adsorbent, for example, a styrene resin supporting thereon an optically active L-hydroxyproline is used. After forming a complex by contact with a solution containing divalent copper ion, it is used for optically resolving an amino acid by ligand exchange. In this case, because the efficiency of resolution is very low and because copper ion is discharged along with the resolved amino acid, such a known method is not satisfactory in practice. For analytical purposes, there is known porous silicagel coated with an optically active poly (triphenylmethyl methacrylate). Such a filler is, however, low in service life and therefore, it is not suited for industrial application. In any event, conventional methods are unsatisfactory with respect to service life, cost and ease of manufacture.

There is proposed a method of producing of graft polymer comprising reacting an α-amino acid N-carboxy anhydride with a polymer having an aminomethylphenyl group, whereby to obtain a polymer with graft-linked poly(amino acid) residue (Japanese Provisional Publication No. 51-26997, 1976). It is described in the Provisional Publication that this graft polymer is useful for racemic resolution of various amino acids.

The present inventor has found that the optical resolution proceeds in an asymmetric area defined by side chains of the poly(amino acid). To allow an optical antipode to freely enter into the asymmetric area, the main chains of the poly(amino acid) must be spaced apart from one another, and further the space formed by meshes of the carrier polymer must be filled with a solvent. In order to satisfy the above conditions, it is essential that the carrier polymer have an affinity for the solvent used.

In the technique of the above Japanese Provisional Publication, the carrier polymer(skeleton polymer) is hydrophobic (e.g. polystyrene-divinyl benzene) and has no affinity for the solvent(water) used in the racemic resolution of amino acids. The Japanese Provisional Publication, describes that the affinity of the graft polymer for water can be controlled by varying the ratio of graftic constituents to skeleton polymers. However, as a matter of fact, for providing the hydrophilicity to the graft polymer, a large quantity of poly(amino acid) (in exmples: 60.1%–82%) must be grafted, and therefore the main chains of poly(amino acid) are not away with one another. For the above two reasons, in the case of the graft polymer of the known technique, the access of optical antipode(amino acid) to the asymmetric area is difficult, and therefore the degree of racemic resolution is very low, or the resolution is impossible.

When the skeleton polymer has no affinity for the solvent used in the adsorbing treatment, the substance to be separated and skeleton polymer can interact with each other such as by adsorption, resulting in the lowering of the selectivity in optical resolution.

The present invention has been made from a consideration of the above-discussed problems of known techniques of optical resolution of racemic mixtures.

The present inventor has found that a cross-linked polymer containing an optically active synthetic poly(amino acid) and a carrier polymer as its constituents can be used as an adsorbent capable of adsorbing one of the racemic bodies preferentially owing to stereostructure of the poly(amino acid) component, asymmetric environment based on such a structure and ease of access of optical antipode to the asymmetric area, performing optical resolution at a high efficiency.

It has also been found that the specific stereostructure of the poly(amino acid) permits the use thereof as an adsorbent capable of showing a high preference to specific metal ion unlike known ion exchange resins.

There is provided in accordance with the present invention, a method of adsorbing a substance comprising contacting a solution of the substance in a solvent with an adsorbent, consisting of a cross-linked polymer comprising as constituents, an optically active, synthetic poly(amino acid) represented by the general formula (I):

wherein R stands for an organic group, R' stands for hydrogen or an alkyl group and n is an integer of at least 5, and a carrier polymer supporting said synthetic poly(amino acid) thereon, said carrier polymer having an affinity for said solvent.

In another aspect, the present invention provides a method of producing the above cross-linked polymeric material.

The present inventor has also found that by protecting the terminal amino group of the poly(amino acid) with a suitable protective group represented by the following general formula (II):

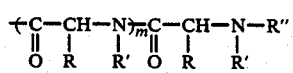

wherein R, R' has the same meaning as above, R" stands for an organic group and m is an integer not less than 4, acid-base adsorption which is undesirable in the optical resolution of racemic mixtures can be prevented so that the efficiency of the optical resolution as well as the recovery rate of isomers can be improved markedly.

As a further aspect, the present invention provides an adsorbent, formed of the above cross-linked polymeric material protected at the terminal amino group.

In the synthetic poly(amino acid)

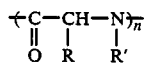

which is a constituent of the polymeric material used in the invention, the organic group R may be of any kind, for example, may be an alkyl group, an aromatic group such as a phenyl group, an aralkyl group or a heterocyclic ring-containing group having nitrogen as a ring constituent. The group R may form a ring together with the nitrogen atom of the same amino acid unit

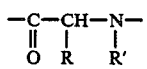

These groups, may contain various substituents such as —OH, —COOH, —SH, —NH$_2$ and —SCH$_3$. These substituents may take the following forms. For example, —OH and —SH may be in the form of an ether (e.g., methyl ether and benzyl ether) or the form having an acyl group bonded thereto, —COOH may be in the form of an ester or amide, and —NH$_2$ may be in the form having a carbobenzoxyl group bonded thereto.

The group R' is hydrogen or an alkyl group such as a methyl group or an ethyl group.

The group R" located at the N-terminal represented by general formula(II) is hydrogen or an organic group.

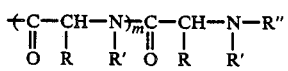

wherein R, R' has the same meaning as above, m is an integer not less than 4. It is preferred that the group R" be organic group of a type which is capable of lowering the basicity of the terminal amino group since, as the basicity is lowered, the contribution of acid-base adsorption is reduced and, hence, the selectivity of adsorption is improved. Examples of the organic group R" include an urethane type protective group which is known as an amino protective group in the field of peptide synthesis, such as a carbobenzoxy group or tertbutoxycarbonyl group; an acyl type protective group such as a formyl group, acetyl group, benzoyl group, phthalyl group or tosyl group; or an alkyl type protective group such as a trityl group. In this instance, the protective group is preferred to be chemically stable and hardly eliminated. For instance, among the acyl type protective groups, the acetyl group (CH$_3$CO—) or benzoyl group (C$_6$H$_5$CO—) is preferred to the formyl group (HCO—).

Examples of α-amino carboxylic acids,

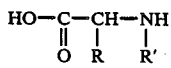

the constituent monomer unit of the synthetic poly(amino acid) include: optically active amino acids constituting protein, for example, alanine, valine, leucine, phenylalanine, proline and the like; D- or L-type derivatives of protein-forming amino acids such as β-benzyl aspartate, γ-methyl glutamate, γ-benzyl gultamate, ε-carbobenzoxylysine, δ-carbobenzoxy- ornithine, o-acetyltyrosine, o-benzylserin and the like; and optically active α-aminocarboxylic acids other than protein forming amino acids, including sarcosine and its derivatives.

Of the constituent represented by the above general formula, n is an integer not less than 5 and normally not greater than 100, preferably from 10 to 40.

The adsorbent used in the present invention comprises the cross-linked polymer which contains as its constituent an optically active synthetic poly(amino acid) and/or its derivative and a carrier polymer. As described hereinafter, the cross-linking may be effected either by reacting a cross-linking agent with an optically active, synthetic poly(amino acid), by copolymerizing an optically active, synthetic poly(amino acid) having a polymerizable vinyl group at its terminal with a monomer containing a polymerizable vinyl group, or by grafting a poly(amino acid) onto a cross-linked, polymeric carrier through the reaction of the carrier with an optically active poly(amino acid) or an -amino acid anhydride. Therefore, the structure of the cross-linked portion varies depending on the method of manufacture. Since the excellent substrate selectivity of the adsorbent is attributed to the optically active poly(amino acid) and/or its derivative, other constituents may be of any kind as long as they are polymers. However, they are preferred to be able to swell in a solvent to be used in the adsorbing stage. Namely, it is preferred that the constituents other than the poly(amino acid) be a hydrophilic polymer in a case using water as the solvent e.g. the racemic resolution of amino acids, and be a hydrophobic polymer in a case of using as the solvent an organic compound such as benzene, toluene or the like e.g. racemic resolution of hydroxy carboxylic acid such as mandelic acid. A hydrophilic carrier polymer has a hydroxyl group or an amide group, examples thereof include a glycidylmethacrylate-ethyleneglycol-dimethacrylate copolymer, an acrylamide-methylenebisacrylamide copolymer. A hydrophobic carrier polymer has a non-polar group, example thereof includes a styrene-divinyl benzene copolymer. And poly(amino acid) itself may also be carrier polymer.

The molecular weight and the cross-linking density of the cross-linked polymer used in the invention are suitably selected according to the substance to be adsorbed. The proportion of the synthetic poly(amino acid) in the cross-linked polymer is also suitably selected although it is in the range of 1–99 wt %, preferable in the range of 10–60 wt %. As mentioned hereinbefore, the adsorbing action of the polymeric material of this invention varies depending upon the solvent system to be used and also upon the function groups and configuration of the substance to be treated. Therefore, in consideration of these conditions, the kind of amino acid and the cross-linking density of the polymer of the invention can be varied appropriately.

For instance, several different kinds of poly(amino acids) may be used in the form of a mixture. Alternatively, R, R' and R" of the amino acid constituent unit can be varied in various ways within one molecule. Further, an optically inactive amino acid like glycine may be incorporated into the abovementioned optically active poly(amino acid), if desired. As described previously, the polymeric material according to the present invention is particularly useful as an adsorbent. The adsorption activity is adjustable by varying the cross-linking density and porosity of the polymeric material. The cross-linking density is suitably determined according to the substance to be treated and generally is rendered smaller as the molecular weight of the substance to be treated is increased. If desired, the adsorbent of this invention can be made porous by the use of a diluent as will be described hereinafter. In such a case, the pore diameter is controlled in correspondence to the molecular diameter of the substance to be treated (normally a pore diameter is about 10 times as great as the molecular diameter of the substance). The cross-linking adsorbent is varied depending upon its porosity. When the the adsorbent is non-porous, the cross-linking density is preferably in the range of 0.01–50 %, more preferably in the range of 0.5–10%. In the case of porous adsorbent, the cross-linking density is preferably 0.1–100%, more preeerably 5–30%.

Since the interaction between the adsorbent and the substance to be adsorbed is influenced by various causes such as hydrophobic bond, ion bond, hydrogen bond and steric hindrance, the amino acids of the cross-linked polymer for use as the adsorbent of this invention are to be selected in correspondence to the solvent system used in the adsorption stage. For example, when the adsorption is effected using water as a solvent, hydrophobic amino acids such as valine, leucine and phenylalanine; acidic amino acids such as lysine and ornithine; and amino acid derivatives having interaction by a hydrophobic bond, hydrogen bond or steric hindrance such as β-benzyl aspartate, γ-benzyl glutamate, N-benzyl glutamine, N-benzyl asparagine, N-cyclohexyl glutamine and N-cyclohexyl asparagine, may be suitably used as the amino acid components.

The polymeric material used in the present invention can be suitably produced by the following four separate methods.

(1) An N-carboxy anhydride (hereinafter referred to as "NCA") of an optically active amino acid or its side chain derivative expressed by the general formula

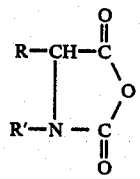

(in which R and R' has the same meaning as described above) is synthesized from a corresponding optically active amino acid or its side chain derivative by a known method as described, for example, in BIOPOLYMERS by M. Goodman, vol. 15, p.1869 (1976).

The thus obtained NCA is then polymerized, singly or as a mixture of two or more kinds, in an inert organic solvent in the presence of a polyfunctional amine as an initiator, thereby to obtain a polyfunctional, optically active, synthetic poly(amino acid) having amino groups -NHR at its terminals. The poly(amino acid) is cross-linked using a cross-linking agent capable of reacting with the amino group -NHR, such as a polyisocyanate or an epoxy resin, to give a cross-linked polymer containing an optically active, synthetic poly(amino acid).

Illustrative of optically active amino acids or their derivatives used for the preparation of NCA are either one of D- and L- forms of alanine, valine, leucine, phenylalanine, β-benzyl aspartate, γ-methyl glutamate, ε-carbo- benzoxylysine, δ-carboxybenzoxyornithine, o-acetyltyrosine and o-benzylserine. The optically active amino acids or their derivatives usable for the purpose of the present invention are not limited to the above examples. For example, as glutamic acid γ-esters, there may be used methyl, ethyl, propyl, benzyl, p-nitrophenyl, cyclohexyl and the like esters. Further, a plural number of optically active, synthetic poly(amino acids) and/or their side chain derivatives may be used as a mixture to produce a corresponding mixture of NCA. In the production of NCA, the carboxyl groups of acidic amino acids and amino and hydroxyl groups of basic amino acids are protected with protective groups. The protective groups may be remained as such or may be removed before polymerization.

The polymerization of NCA is performed at a temperature of about −10 to 100° C., preferably about 20° to 40° C. for a period of time sufficient to permit n of the above general fomula to become 5 or more. Specifically, the reaction time is preferable about 0.5 to 120 hours, more preferably about 24 hours. Illustrative of suitable inert organic solvent are 1,2-dichloroethane, chloroform dioxane, tetrahydrofuran, N,N-dimethylformamide, N,N-dimethylacetamide, acetonitrile, benzene, nitrobenzene and o-nitrosoanisole. It is preferred that these solvents be completely dehydrated and purified before use.

Examples of the polyfunctional amines used as an initiator for the polymerization of NCA include primary and secondary amines such as ethylenediamine, hexamethylenediamine, diethylenetriamine and polyamines such as Jafferamine R T-403 (manufactured by Mitsui-Texaco Co., Ltd.).

The reaction of the polyamino acid with the cross-linking agent may be easily performed using an inert organic solvent and in the atmosphere of a non-reactive gas, especially nitrogen. It is preferable to use as small an amount of the solvent as possible and sufficient to dissolve the starting materials.

The resulting cross-linked polymer is ground, washed well with the organic solvent used and then purified. The polymer is further washed with methanol, acetone or the like, followed by drying under a reduced pressure at about 40° to 80° C. for drying.

(2) In the same manner as the method (1) above, NCA is polymerized, singly or as a mixture of several kinds, with a monofunctional and/or polyfunctional amine to obtain a mono and/or polyfunctional, optically active, synthetic poly(amino acid) having amino group or groups -NHR' at its terminal or terminals. The resultant poly(amino acid) is then reacted with a vinyl monomer having at its side chain a functional group reactive with the amino group, such as acrylic acid chloride, glycidylmethacrylate or chloromethylstyrene to give an optically active, synthetic poly(amino acid) containing polymerizable vinyl group or groups at its terminal or terminals (the product being hereinafter referred to as "macromer"). In addition to the above method, the macromer may be prepared by polymerizing NCA using as an initiator a polymerizable vinyl monomer having an amino group at its side chain.

The thus obtained macromer is then subjected to copolymerization with a monomer described hereinafter and having one or more polymerizable vinyl groups.

Illustrative of suitable monofunctional amines used in the polymerization of NCA are primary monoalkylamines such as n-butylamine, n-propylamine and n-hexylamine.

Examples of suitable monomers containing one or more polymerizable vinyl groups and used as a component to be copolymerized with a macromer for the preparation of a cross-linked polymer include hydrophilic monomers or monomers capable of being imparted with hydrophilicity later on, such as 2-hydroxyethyl-methacrylate, acrylamide, vinyl acetate, glycidylmethacrylate, and monomers having a plurality of polymerizable vinyl groups, such as divinylbenzene, methylenebis(acrylamide) and ethylene glycol dimethacrylate.

The cross-linking may be performed by solution polymerization, bulk polymerization, suspension polymerization or the like polymerization in any known manner in the presence of, for example, a compound capable of forming peracid radical such as dibenzoyl peroxide or dilauroyl peroxide or an azo compound such as asobis(isobutylonitrile), azobis(2,4-dimethyl- valeronitrile) dihydrochloric acid salt.

The suspension polymerization, for example, may be conducted in the manner set forth below. The starting materials are first dissolved in an inert organic solvent, preferably an aromatic hydrocarbon such as benzene or toluene, an aliphatic hydrocarbon such as n-octane or an alcohol such as cyclohexanol or lauryl alcohol. Advantageously, the organic solvent is used in an amount of 1 part by weight per 1 part by weight of the reactant raw materials if it can completely dissolve the monomer and macromer. Generally, the solvent is used in an amount of 0–3 parts by weight. The reaction solution is then mixed with an aqueous protective colloid solution, especially an aqueous solution of polyvinylalcohol, in an amount of 2 to 25 parts by weight per 1 part by weight of the reaction solution, with the use of an efficient stirrer. The resulting mixture is heated to a temperature of about 40° C. to 100° C., preferably to a temperature of about 60° C. in a non-reactive gas, particularly in a nitrogen atmosphere. The polymerization time is about 4 to 72 hours, preferably about 10 to 24 hours.

When the macromer and monomer can be dissolved only in water or a solvent miscible with water, they can be polymerized by way of suspension polymerization in the presence of a suitable protective colloid using as a dispersing medium a solvent immiscible with water and the water-miscible solvent.

The thus obtained cross-linked polymer is separated from the reaction solution by filtration, washed with a solvent capable of dissolving the protective colloid, and then with dioxane, methanol, acetone or the like, and dried at a temperature of about 40° to 80° C. under a reduced pressure.

(3) A cross-linked polymer- carrier with a functional group which is convertible into an amino group or into which an amino group can be introduced, is produced by a known method, followed by conversion of the functional group into an amino group or introduction of an amino group thereinto. NCA is polymerized, using the thus obtained carrier with an amino group as an initiator, to obtain a cross-linked polymer with the carrier supporting an optically active, synthesized poly(amino acid) thereon.

Examples of the cross-linked polymer carrier with a functional group convertible to an amino group or capable of being introduced with an amino group include chloromethylstyrene-styrene-divinylbenzene copolymers, acrylamide-methylenebisacrylamide copolymers, glycidylmethacrylate-ethylene glycol dimethacrylate copolymers and the like. Namely, the carrier may be any crosslinked polymer which is produced by polymerizing monomers having a functional group convertible into an amino group such as chloromethylstyrene or the like, or monomers having a functional group capable of being introduced with an amino group such as glycidylmethacrylate or the like.

Chloromethylstyrene-styrene-divinylbenzene copolymers can be obtained either by copolymerizing of chloromethylstyrene, styrene and divinylbenzene, or by chloromethlating of styrene-divinylbenzene copolymer with a chloromethyl-methlyl ether in the presence of a catalyst such as $ZnCl_2$.

The suspension polymerization of these copolymers may be easily effected in the same manner as described at (2) above. In this case, it is possible to obtain a porous spherical gel by adding a suitable diluent to the monomer phase.

With regard to the kind of the diluent, it is suitable to use an organic solvent by which the product gel is sparingly swelled. For instance, suitable diluents for chloromethylstyrene- styrene-divinylbenzene copolymer are octane, decane, dodecane and the like. In an alternative, the polymerization may be effected using a linear polymer such as a polystyrene, polymethylstyrene, polymethyl acrylate or the like in lieu of a diluent, subsequently extracting the linear polymer from the resulting spherical gel to obtain a porous spherical gel. The porousness is imparted to carriers of both high and low cross-linking densities, but in most cases to carriers of a high cross-linking density. The polymeric material having a porous structure is advantageously used as adsorbent since it permits the substance to be adsorbed to enter into the pores, facilitating the contact between the functional group and the substance. The porous polymeric material with a high cross-linking density is especially suited for use in chromatography, because it hardly swells or contracts upon contact with an eluent and has a higher mechanical strength.

The reactions for converting the functional group of the carrier into an amino group or introducing an amino group thereinto are discussed in detail, for example, by R. B. Marriefield, J.A.C.S., vol. 98, p. 7357 (1976), by J. K. Inman, Biochemistry, vol. 8, p. 4074 (1969), or by J. Kalal, Die Angew. Maklomol. Chem., vol. 63, p.23 (1977).

For example, the chloromethyl group of the carrier polymer is converted into an aminomethyl group by reaction with an ammonia, or with a potassium phthalimide and then with a hydrazine, and similarly the chloromethyl group of the carrier polymer is converted into an aminoalkylene substituted aminomethl group by reaction with an polyfunctional amine, such as ethylene diamine, N-methyl-ethylenediamine, hexamethylenediamine and diethylenetriamine, as shown below.

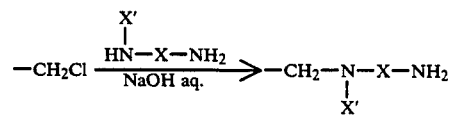

wherein X stands for an alkylene group, X' stands for hydrogen or an alkyl group.

For example of the method of the above converting, the carrier polymer is swelled with toluene, thereto being added a large excess of amine and alkali aqueuos solution to chloromethyl group. The reaction is performed at a temperature of 60°–90° C., for 6–12 hours.

The resulting carrier of a cross-linked polymer with an amino group is washed and then completely dehydrated by a Soxhlet's extractor or any other suitable means, and dried sufficiently with heating under a reduced pressure.

The polymerization of NCA is performed in the same manner as that of (1) above except that the amino groups contained in the cross-linked polymer carrier are utilized as an initiator. The polymerization is preferably performed for about 24 to 72 hours.

With regard to the amino group on the carrier, a primary or secondary amino group is generally used. But it is preferable to use a primary amine-containing carrier as an initiator since it can support the poly(amino acid) quantitatively.

The thus obtained cross-linked polymer having supported thereon an optically active, synthetic poly(amino acid) is washed with a solvent capable of dissolving free poly(amino acid) such as dimethylformamide or dioxane and then with acetone or the like and is dried with heating under a reduced pressure, thereby obtaining a purified, cross-linked polymer of this invention.

(4) NCA is polymerized, singly or as a mixture of several kinds, with a monofunctional amine in the same manner as described at (1) above to obtain an optically active, synthetic poly(amino acid) having an amino group —NHR at its terminal.

Separately, a cross-linked polymer carrier having a functional group capable of reacting with the amino group —NHR is prepared in any known manner and is reacted with the above amino group-containing poly(amino acid) to obtain a cross-linked polymer having supported thereon the optically active, synthetic poly(amino acid).

Examples of suitable cross-linked polymer carrier include glycidyl methacrylate-ethylene glycol dimethacrylate copolymers described at (3).

The reaction for supporting the poly(amino acid) on the cross-linked polymer carrier is performed in a solvent capable of dissolving the poly(amino acid) at a temperature of about 40° to 80° C. The reaction time varies depending on the kind of the cross-linked polymer carrier used. For instance, the reaction time is about 72 hours in the case of glycidyl methacrylate-ethylene glycol dimethacrylate copolymers.

In all the above-described methods (1) through (4), the optically active, synthetic poly(amino acid), which has chemically convertible side chains, may be subjected to chemical conversion to convert, for instance, its ester groups to amide groups, thereby forming an optically active synthesized poly(amino acid) with a different chemical structure. This chemical conversion is effective to obtain an adsorbent suitable for the adsorption of a particular substance.

Constituents of the cross-linked polymer except the poly(amino acid), such as the cross-linked polymer carrier and the like, may also be subjected to a chemical conversion for converting their chemical structures. For example, when a glycidyl methacrylate-ethylene glycol methacrylate copolymer is used as the carrier, the copolymeric carrier may, after supporting thereon the poly(amino acid), be hydrolyzed for the cleavage the rings of the epoxy groups remaining therein in order to impart hydrophilicity thereto. This chemical conversion is also effective for obtaining an adsorbent suitable for a particular substance to be separated.

In the method (2) or (4), the poly(amino acid) may be obtained using as an initiator for NCA a customarily used initiator in place of the monofunctional primary amine. Illustrative of such known initiators are secondary amines, tertiary amines, quaternary ammonium salts, alkali metal alkoxides, boron hydrides, boron oxides, inorganic salts, organometallic compounds and polymers having an amino group at their terminals.

As described previously, it is preferred that the N-terminal or terminals of the poly(amino acid) in the cross-linked, polymeric material be protected by an organic group. The protection of the N-terminals may be conducted after the preparation of the non-protected polymer. When the chemical conversion of its side chains and/or cross-linked polymer carrier is carried out, the protection of the N-terminals may be done either before or after the chemical conversion. In a case where it is likely that a new amino terminal is produced in the side chain during the conversion reaction of the poly(amino acid) by breakage of a main chain or the like, however, it is preferred that the amino terminal be protected subsequent to the conversion reaction. On the other hand, if the conversion reaction has a possibility of rendering the side chain of the poly(amino acid) susceptible to reaction with a protective reagent, it is preferable to protect the amino terminal prior to the conversion reaction.

The condition of the reaction for protecting the terminal amino group are determined suitable depending upon the kind of the reagent to be employed. For example, when an acetyl group is introduced as a protecting group, the crosslinked polymer carrying the poly(amino acid) is first swelled with a suitable solvent, for instance, dioxane, and the mixture, after being added with acetic anhydride in an amount of 1–1000 times the amount of the terminal amino group, in terms of chemical equivalent, is then stirred at a temperature of 5° C. to 70° C.

The thus obtained poly(amino acid) supported on a carrier of a cross-linked polymer and protected at the terminal amino group no longer retains the action of acid-base adsorption between a substance to be separated and the terminal amino group. Accordingly, when packed in a column for assessment by liquid chromatography, the adsorbent of the invention can exhibit markedly improved yield of the resolved substance, showing a sharp peak on the chromatogram with a reduced tailing. It follows that, when the polymeric material of the present invention is used for resolution of a racemic mixture, peaks of the respective optically active units are less overlapped one on another and each one of recovered optically active units has a higher optical purity.

The polymeric material used in the present invention can be suitably used as an adsorbent for optical resolution. The resolution may be either by a batchwise process or by column chromatography. In the case of separation of an optically active substance which is hardly separable, it is desirable to sieve the crosslinked polymer before use in column chromatography.

Normally, the column chromatography is carried out in the manner as follows. In the first place, the adsorbent is suspended in a solvent to be used as an eluent, and the resulting suspension is put into a column. The substance to be separated is dissolved in a solvent of as small an amount as possible, and the resulting solution is transferred to the top of the column, treating the column with the eluent and collecting the elute in a number of fractions by ordinary procedures.

The degree of resolution of the racemic bodies can be determined by measuring the optical rotation of the respective fractions.

It is possible to resolve various kinds of racemic mixtures by the use of the cross-linked polymer adsorbent according to the invention. For instance, racemic mixtures of hydroxycarboxylic acids, amino acids and derivatives of these compounds can be resolved efficiently.

In addition, it is extremely useful as an adsorptive separator for peptides, proteins, metal ions and the like.

The invention is hereafter illustrated more particularly by way of examples, but the invention is not limited to the following production and application examples.

EXAMPLES OF PRODUCTION OF CROSS-LINKED POLYMERIC MATERIAL

EXAMPLE 1

Figure 1:
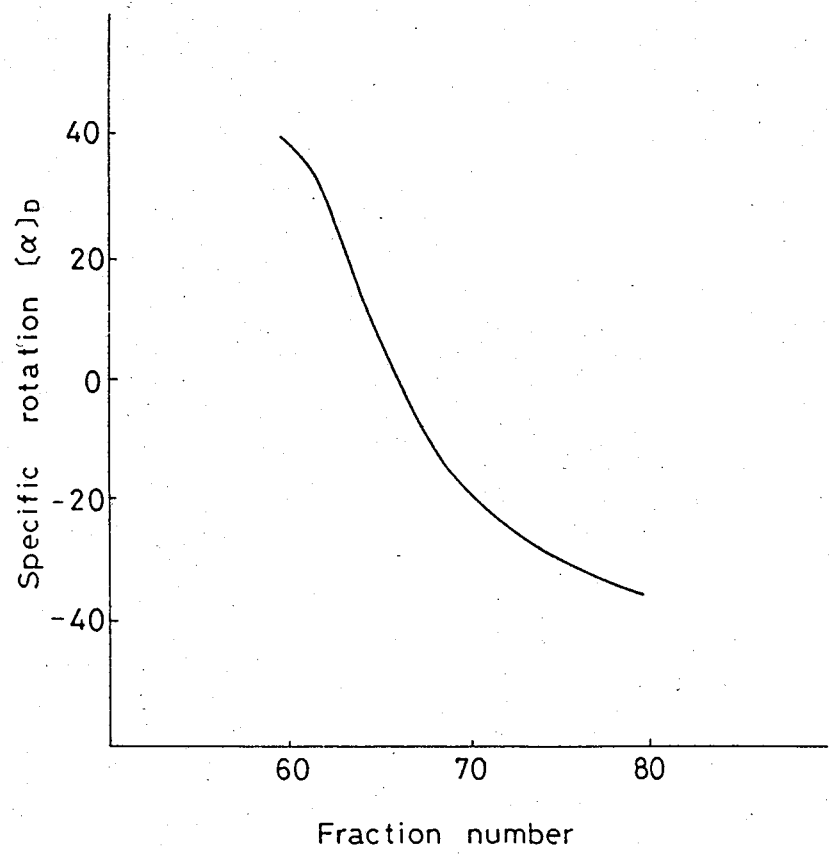
FIG. 1 is a graph showing the results of column chromatography in accordance with the present invention, in which the abscissa indicates the fraction number and the ordinate indicates specific rotation.

To a mixture of 50 g of γ-benzyl-L-glutamate and 500 ml of tetrahydrofuran was added a mixture of 29.7 g of phosgene and 62.3 g of benzene, followed by stirring at 65° C. for 1.5 hours. The resulting transparent reaction liquid was poured into 1 liter of petroleum ether to precipitate white crystals of γ-benzyl-L-glutamate NCA (hereinafter referred to simply as "γ-BLG NCA"). These crystals were filtered out and, after washing with petroleum ether, dried on diphosphorus pentoxide under a reduced pressure. The crystals had a melting point of 93°–94° C. and a molecular weight of 263, and the yield was 50 g. A mixture containing 13.875 g of the γ-BLG NCA, 0.812 g of Jafferamine RT-403 (manufactured by Mitsui-Texaco Co., Ltd.) and 13.875 g of N,N-dimethylformamide (hereinafter referred to as DMF) was stirred at 30° C. for 24 hours to obtain a solution of poly ( γ-benzyl-L-glutamate) (hereinafter referred to as PBLG) in DMF. The polymer had a number-average molecular weight of about 8300. To 10 g of the solution were added 0.32 g of 2,4-tolylenediisocyanate, 0.082 g of trimethylolpropane and 0.01 g of dibutyltindilaurate and the mixture allowed to stand in a test tube at room temperature for 72 hours to obtain a cross-linked polymer in the form of a transparent gel (non-porous) which was insoluble in ordinary organic solvents. The polymer was taken out from the test tube, washed with dioxane and acetone, dried and pulverized.

EXAMPLE 2

A solution containing 22.58 g of γ-BLG NCA, 0.258 g of ethylenediamine and 205.54 g of DMF was stirred at 30° C. for 24 hours and the resulting mixture was poured in excess diethyl ether to cause precipitation, followed by filtration. The number-average molecular weight of the thus obtained PBLG was about 5600. A solution containg 5.0 g of the PBLG, 10.0 g of glicidyl methacrylate (hereinafter referred to as GMA), 27.0 g of 1,2-dichloroethane, 3.0 g of DMF and 1.0 g of triethylamine was stirred at 50° C. for 1 hour, to which was then added 0.075 g of α,α'-azoisobutylonitrile (hereinafter referred to as AIBN) and 1.0 g of 1,2-dichloroethane. After mixing thoroughly, 1.35 g of polyvinylalcohol and 135.0 g of water were added to the mixture. The resultant mixture was stirred at 60° C. for 16 hours in the atmosphere of nitrogen at a revolutional speed of about 600 rotation/min to obtain a cross-linked polymer. The polymer was filtered, washed successively with hot water, DMF, methanol and acetone and dried at about 60° C. under vacuo. The resultant cross-linked polymer was white opaque spherical gel. The yield was 10.0 g.

Elementary analysis: C: 57.75% H: 6.58% N: 2.01% The elementary analysis value of N is almost zero when no amino acids are used. Therefore, it is evident that the abovementioned N is derived from the amino acid. The content of PBLG calculated from the elementary analysis value (N: 2.81%) is 28.7%.

IR: 1650 cm$^{-1}$ (amide) 840 cm$^{-1}$, 900 cm$^{-1}$ (epoxy) 10 g of the PBLG-containing, cross-linked polymer were suspended in a mixed liquid composed of 30 ml of 1% $H_2SO_4$ aqueous solution and 30 ml of dioxane and the suspension was stirred at 50° C. for 5 hours. Thereafter, the cross-linked polymer was isolated for purification. The IR spectrum no more showed the absorption of 840–910 cm$^{-1}$ ascirbed to epoxy rings. Instead, there appeared a new absorption at about 3400 cm$^{-1}$ ascribed to the hydroxyl group.

Elementary analysis after hydrolysis: C: 54.25% H: 7.08% N: 1.72%

EXAMPLE 3

A solution consisting of 2.0 g of chloromethylstyrene, 2.74 g of 55% divinylbenzene (cross-linking agent), 95.26 g of styrene and 0.67 g of 75% dibenzoyl peroxide was added to a solution consisting of 4.0 g of polyvinyl alcohol and 400 g of water. This mixture was stirred in the atmosphere of nitrogen at 70° C. for 10 hours at a speed of 1000 r.p.m. The resulting cross-linked polymer of chloromethylstyrene-styrene-divinylbenzene copolymer was isolated in the same manner as in Example 2. The cross-linked polymer was translucent sphereical gel.

85.8 g of this cross-linked polymer were mixed with 85.8 g potassium phthalimide and 686 ml of DMF, and, after stirring at 120° C. for 6 hour, the cross-linked polymer was filtered out, followed by washing and drying. Thereafter, the cross-linked polymer was mixed with 68.6 ml of hydrazine hydrate and 686 ml of dioxane and, after stirring at 90° C. for 6 hours, the cross-linked polymer having its chloromethyl group converted to and aminomethyl group was filtered out, washed sufficiently and dried completely. The content of amino group in this polymer was 0.17%.

81 g of the resulting cross-linked polymer carrier in the form of a gel was dispersed in a solution of 32.4 g of the aforementioned γ-BLG NCA and 648 ml of dioxane, and stirred in at atmosphere of nitrogen for 72 hours at 30° C. for polymerization, followed by isolation and refining in the same manner as that of Example 2. The values of elementary analysis of the product were as follows.

C: 85.40% H: 7.15% N: 1.66%

The content of poly (γ-benzyl-L-glutamate) (hereinafter referred to as "PBLG") calculated from the value of the elementary analysis (nitrogen: 1.66%) was 23.8%, and the degree of polymerization was 11.1.

IR: 1735 cm$^{-1}$ (ester) 1650 cm$^{-1}$ (amide)

EXAMPLE 4

40 g of the cross-linked polymer supporting PBLG (obtained in Example 3) were dispersed in 200 ml of benzylamine and stirred at 60° C. for 30 hours, followed by isolation and refining in the same manner as that of Example 2. The ester absorption peak at 1735 cm$^{-1}$ in IR spectrum was reduced and the amide absorption peak at 1650–1670 cm$^{-1}$ was increased. From this it was clear that benzylester was converted into N-benzylamide. The conversion rate calculated from the reduction of absorbance of ester in IR spectrum was about 70%.

Values of elementary analysis C: 86.24% H: 7.53% N: 2.40%

EXAMPLE 5

A solution containing 35 g of acrylamide, 15 g of methylenebis (acrylamide), 0.05 g of azobis(2-amidinopropane) dihydrochloric acid salt, 50 g acetonitrile and 50 g of water was added to a solution containing 10.5 g of ethyl cellulose and 1050 g of cyclohexane. The mixture was stirred at 50° C. for 10 hours in the atmosphere of nitrogen to obtain a cross-linked polymer in the form of a white porous hard spherical gel composed of an acrylamide-methylenelbis (acrylamide) copolymer. The cross-linked polymer was isolated in the same manner as that of Example 2, 20 g of which was then dispersed in 150 ml of ethylenediamine. After stirring at 60° C. for 4 hours, the dispersion was filtered and the precipitate was washed and completely dried.

15.0 g of the thus obtained, porous, cross-linked polymer carrier were dispersed in a solution containing 7.5 g of D-phenylalanine NCA (obtained in the same manner as that of Example 1) and 75 ml of DMF and the dispersion was stirred at 40° C. for 20 hours. The resulting cross-linked polymer acrylamide-methylenebis (acrylamide) cross-linked polymer was isolated and purified. The refined polymer was in the form of a white, porous, hard, spherical gel and contained 20.4% of poly (D-phenylalanine). The degree of polymerization (n) was 9.0.

EXAMPLE 6

A solution containing 180 g of GMA, 20 g of ethylene glycol dimethacrylate, 250 g of 1,2-dichloropropane, 62.5 g of lauryl alcohol and 1.0 g of AIBN was mixed to a solution containing 15.4 g of polyvinyl alcohol and 1540 g of water. The mixture was then stirred at 60° C. for 10 hours at 1000 r.p.m. The resultant cross-linked polymer was isolated and purified in the same manner as that of Example 2 to give a translucent, porous, sphrical gel.

The thus obtained cross-linked polymer (160 g) was dispersed in 640 g of a dioxane solution containing 0.02% ammonia and the dispersion stirred at 60° C. for 6 hours for the introduction of a primary amino group.

After filtration, the product was washed and completely dried. The content of nitrogen was 0.08%.

The thus obtained porous, cross-linked polymer carrier (120 g) was dispersed in a solution containing 24 g of β-benzyl-L-aspartate NCA and 840 ml of DMF and the dispersion was stirred at 30° C. for 72 hours in the atmosphere of nitrogen to effect the polymerization of the NCA. The product, after isolation and refining, contained 13.0% of poly (β-benzyl-L-aspartate) (hereinafter referred to as PBLA) and a degree of polymerization (n) of 11.1.

The epoxy rings (derived from GMA) remaining in the PBLA-containing, cross-linked polymer were hydrolyzed in the same manner as Example 2 to open the rings and to impart hydrophilicity to the polymer.

EXAMPLE 7

20 g of PBLA-carrying, cross-linked polymer obtained in Example 6, 50 ml of 4% NaOH aqueous solution and 50 ml of dioxane were mixed with each other. After being allowed to stand at room temperature for one day, the mixture was filtered to isolate the cross-linked polymer with its benzyl groups being eliminated, followed by washing and drying. The IR spectrum of the resulting product showed no absorption attributed to the benzyl group.

EXAMPLE 8

2 g of ε-carbobenzoxy-L-lysine NCA obtained in the same manner as that of Example 1, 10 g of the cross-linked polymer obtained in Example 6 and having introduced thereinto a primary amine, and 60 ml of DMF were mixed with each other and the mixture stirred at 35° C. for 72 hours in the atmosphere of nitrogen to obtain a cross-linked polymer carrying poly (ε-carbobenzoxy-L-lysine) (hereinafter referred to as PCLL). The content of PCLL was 15.4% and the degree of polymerization was 10.9. The PCLL-carrying, cross-linked polymer was subjected to hydrolysis in the same manner as that of Example 2 for opening the epoxy rings remaining therein. The hydrolyzed product was dispersed in 50 ml of a saturated HBr acetic acid solution and the dispersion was stirred at room temperature for 4 hours. The resulting cross-linked polymer with its carbobenzoxy groups being removed was filtered, washed with aqueous ammonia and water, and dried under vacuo.

EXAMPLE 9

From 24 g γ-BLG NCA and 0.67 g of n-butylamine, 18.3 g of PBLG having a polymerization degree (n) of 10 were prepared in the same method as used in Example 2. Then a mixture containing 10 g of the PBLG, 20 g of the cross-linked polymer of Example 6 into which no primary amine was introduced, 60 g of dioxane and 60 g of DMF was stirred at 60° C. for 72 hours, from which a cross-linked polymer of a GMA-ethylene glycol dimethacrylate copolymer carring PBLG was isolated and purified. The amount of PBLG was 5.3%.

EXAMPLE 10

A solution consisting of 1.0 g of chloromethylstyrene, 18.27 g of 55% divinylbenzene (cross-linking agent), 79.73 g of styrene and 0.67 g of 75% dibenzoyl peroxide and 80.0 g n-octane (diluent) was added to a solution consisting of 4.0 g of polyvinyl alcohol and 400 g of water. This mixture was stirred in the atmosphere of nitrogen at 70° C. for 10 hours at a speed of 1000 r.p.m. The resulting cross-linked polymer of chloromethylstyrene- styrene-divinylbenzene copolymer was isolated in the same manner as in Example 2. The cross-linked polymer was white, porous, spherical gel. By the same procedure as in Example 3, there was obtained a cross-linked polymer with its chloromethyl group being converted to an aminomethyl group. The amino group content in this polymer was 0.18%.

81 g of the thus obtained porous cross-linked polymer was dispersed in a solution consisting of 32.4 g of γ-benzyl-D-glutamate NCA, which was prepared in the same manner as in Example 1, and 648 ml of dioxane, and stirred in an atmosphere of nitrogen at 30° C. for 72 hours for polymerization, followed by isolation and refining of the cross-linked polymer. The content of poly (γ-benzyl-D-glutamate) which was calculated from the value of elementary analysis (N: 1.56%) was 23.5%, and the degree of polymerization was 21.9%.

The thus obtained cross-linked polymer carrying poly (γ-benzyl-D-glutamate) was treated in the same manner as in Example 4 to convert benzyl ester into benzyl amide. The conversion was about 80%.

EXAMPLE 11

Into a mixture of 21.9 g of γ-methyl-L-glutamate NCA obtained in the manner similar to that described in Example 1 and 600 ml of 1,2-dichloroethane were dispersed 60 g of the crosslinked polymer carrier in the form of a gel obtained in Example 3 and the dispersion was reacted in the atmosphere of nitrogen at 30° C. for 48 hours with stirring for polymerization of the NCA, followed by isolation and refining in the same manner as that of Example 2. The elementary analysis of the product revealed as follows.

C: 83.99% H: 7.52% N: 2.12%

The content of poly (γ-methyl-L-glutamate) (hereinafter referred to as "PMLG") calculated from the results of the elementary analysis was 21.2%, and the degree of polymerization was 21.0.

60 g of PMLG thus obtained were dispersed in a solution containing 540 ml of 1,2-dichloroethane, 90 g of ethylene cyanohydrine and 65 g of p-toluenesulfonic acid and the dispersion was heated to 81°–83° C. with stirring to effect ester interchange between the methyl ester of PMLG and the ethylene cyanohydrine. To accelerate the ester interchange, the methanol produced was continuously distilled off under normal pressure along with 1,2-dichloroethane used as solvent. The reaction was continued for 6 hours when the amount of the solvent was decreased to half. The reaction product was isolated and purified in the same manner as described in Example 2. The IR spectrum showed a new absorption at 2350 cm$^{-1}$ attributed to a nitrile group. The results of the elementary analysis are as follows.

C:83.05% H: 7.34% N: 2.91%

The increase in nitrogen content is considered to result from the conversion of the methyl ester into cyanoethyl ester.

The cyanoethyl ester which is so-called active ester may be easily converted into amides by reaction with various amines. As examples of such active ester, there may be mentioned esters having an electron-attractive group such as chloroethyl ester, trichloroethyl ester and trifluoroethyl ester.

EXAMPLE 12

The cross-linked polymeric material obtained in Example 11 with its methyl ester in PMLG being converted into cyanoethyl ester (5g) was reacted with 5 g of an amine shown below at a temperature shown below for 24 hours using 40 ml of N,N-dimethyl-acetamide as solvent to form an amide. The results of elementary analysis are also shown below.

| Amine | Reaction Time (hour) | Nitrogen Content (%) |
| --- | --- | --- |
| Benzylamine | 45 | 2.70 |
| Cyclohexylamine | 30 | 2.58 |
| L-α-Phenyl-ethylamine | 65 | 2.38 |
| L-α-amino-ε-caprolactam; | 65 | 3.10 |

IR spectroscopy revealed that the absorption at 2350 cm$^{-1}$ (nitrile) disappeared with the simultaneous decrease of absorption at 1720–1735 cm$^{-1}$ (ester) and increase of absorption at 1650–1670 cm$^{-1}$ (amide). From this, it is apparent that the cyanoethyl ester was converted into amide by reaction with the amine. The polymer obtained by reaction with benzylamine was found to have substantially the same structure as the cross-linked polymeric material obtained in Example 4. The results of this example indicate that various kinds of polymeric materials can be easily obtained by simple modification treatment. This is advantageous because of the availability of polymeric materials suitably for specific substances to be adsorbed thereon.

EXAMPLE 13

To a mixture of 50 g of γ-benzyl-L-glutamate and 500 ml of tetrahydrofuran was added a mixture of 29.7 g of phosgene and 62.3 g of benzene, followed by stirring at 65° C. for 1.5 hours. The resulting transparent reaction liquid was poured into petroleum ether to precipitate white crystals of γ-benzyl-L-glutamate NCA. These crystals were filtered out and, after washing with petroleum ether, dried on diphosphorus pentoxide under a reduced pressure. The crystals had a melting point of 93°–94° C. and a molecular weight of 263, and the yield was 50 g.

Separately, a solution of 2.0 g of chloromethylstyrene, 2.74 g of 55% divinylbenzene (cross-linking agent), 95.26 g of styrene and 0.67 g of 75% dibenzoylperoxide was added to a solution of 4.0 g of polyvinyl alcohol and 400 g of water, and stirred in an atmosphere of nitrogen at 70° C. for 10 hours at a speed of 1000 r.p.m./min, to obtain a cross-linked polymer of chloromethylstyrene-styrene-divinylbenzene copolymer. This cross-linked polymer was in the form of a translucent spherical gel.

85.8 g of this cross-linked polymer were mixed with 85.8 g potassium phthalimide and 686 ml of DMF, and, after stirring at 120° C. for 6 hour, the cross-linked polymer was filtered out, followed by washing and drying. Thereafter, the cross-linked polymer was mixed with 68.6 ml of hydrazine hydrate and 686 ml of dioxane, and, after stirring at 90° C. for 6 hours, the cross-linked polymer having its chloromethyl group converted to an aminomethyl group was filtered out, washed sufficiently and dried completely. The content of amino group in this polymer was 0.17%.

81 g of the resulting cross-linked polymer carrier in the form of a gel was dispersed in a solution of 32.4 g of the aforementioned γ-BLG NCA and 648 ml of dioxane, and stirred in an atmosphere of nitrogen for 72 hours at 30° C. for polymerization, followed by isolation and refining. The values of elementary analysis of the product were as follows.

C: 85.40% H: 7.15% N: 1.66%

The content of PBLG calculated from the value of the elementary analysis (nitrogen: 1.66%) was 23.8%, and the degree of polymerization was 11.1.

IR: 1735 cm$^{-1}$ (ester) 1650 cm$^{-1}$ (amide)

40 g of the cross-linked polymer supporting PBLG were dispersed in 200 ml of benzylamine and stirred at 60° C. for 30 hours, followed by isolation and refining. The ester absorption peak at 1735 cm$^{-1}$ in IR spectrum was reduced and the amide absorption peak at 1650–1670 cm$^{-1}$ was increased. From this it was clear that benzylester was converted into N-benzylamide. The conversion rate calcutated from the reduction of absorbance of easter in IR spectrum was about 70%.

Values of elementary analysis C: 86.24% H: 7.53% N: 2.40%

30 g of the cross-linked polymer carrying PBLG with the converted benzylamide was dispersed in a solution of 180 ml of dioxane and 6 ml of acetic anhydride, and stirred at 30° C. for 24 hours, followed by isolation and refining. Since the content of the terminal amino group of the poly(amino acid) in the crosslinked polymer was very small, there was observed no change between IR spectra and values of elementary analysis before and after the reaction. However, a measurement of acid adsorption capacity by the use of a N/50 -HCl dioxane revealed that the acid adsorption capacity which was 0.10 meq/g before the reaction became 0.01 meq/g after the reaction. This implied that only the terminal amino group of the supported polyamino acid was protected by the acetyl group as a result of the reaction, without leaving in free state almost all of the amino group.

EXAMPLE 14

A solution consisting of 2.0 g of chloromethylstyrene, 18.27 g of 55% divinylbenzene (cross-linking agent), 78.73 g of styrene, 0.67 g of 75% dibenzoylperoxide and 80.0 g of n-octane (diluent) was added to a solution consisting of 4.0 g of polyvinyl alcohol and 400 g of water. This mixture was stirred in an atmosphere of nitrogen at 70° C. for 10 hours at a speed of 1000 r.p.m. The resulting cross-linked polymer of chloromethylstyrene-styrene-divinylbenzene copolymer was isolated in the same manner as in Example 13. The crosslinked polymer was white, porous and spherical gel. By the same procedure as in Example 13, there was obtained a crosslinked polymer with its chloromethyl group being converted to an aminomethyl group. The amino group content in this polymer was 0.18%.

81 g of the thus obtained porous cross-linked polymer was dispersed in a solution consisting of 32.4 g of β-benzyl-L-aspartate NCA, which was prepared in the same manner as in Example 13, and 648 ml of dioxane, and stirred in an atmosphere of nitrogen at 30° C. for 72 hours for polymerization, followed by isolation and refining of the cross-linked polymer. The content of PBLA which was calculated from the value of elementary analysis (N: 1.81%) was 26.1%, and the degree of polymerization was 11.7%.

The thus obtained PBLA-carrying cross-linked polymer was treated in the same manner as in Example 13 to convert benzyl ester into benzyl amide.

IR spectrum of this polymer showed no ester absorption at 1735 cm$^{-1}$, and the conversion rate was about 100%. 35.6 g of the PBLA carrying polymer after conversion to benzylamide was added to a solution consisting of 178 ml of dioxane, 4.9 ml of benzoyl chloride and 3.5 ml of triethylamine, and stirred at room temperature for 12 hours, followed by isolation and refining. The acid adsorption capacity of the resultant crosslinked polymer carrying PBLA, with the terminal amino group being protectd by a benzoyl group, was measured in the same manner as in Example 13. The acid adsorption capacity after benzoylation was 0 meq/g, indicating that the terminal amino group was completely protected by a benzoyl group. In this case, there were observed no changes in IR spectra and values of elementary analysis, similarly to Example 13.

COMPARATIVE EXAMPLE 1

The porous, cross-linked polymer carrier containing no PBLA (obtained in Example 6) was subjected to hydrolysis in the same manner as that Example 2 for opening the epoxy rings thereof.

EXAMPLES OF ADSORPTION TREATMENTS

EXAMPLE 15

Resolution of DL-amino acids was carried out in a batch mode with the use of the cross-linked polymer obtained in Example 2.

Thus, 1 g of the cross-linked polymer was added to a solution composed of 50 mg of a DL-amino acid and 5 ml of water and the mixture allowed to stand at room temperature for a week.

Then the cross-linked polymer was filtered off and the optical rotation of the filtrate was measured. The results are shown in Table 1. The optical rotation was measured by means of a polarimeter (Nihon Bunko DIP-140).

TABLE 1

| DL-amino acid | Optical rotation of filtrate, (degree) |
|---|---|
| Proline | −0.013 |
| Threonine | −0.008 |
| Tryptophane | −0.042 |
| Phenylalanine | −0.033 |

Since L-amino acids show negative optical rotation, the fact that each filtrate has a negative optical rotation indicates that the D-amino acids are adsorbed on the cross-linked polymer adsorbent according to the present invention.

EXAMPLE 16

The cross-linked polymers obtained in Examples 3 and 4 were each classified by metal sieves of 250 and 400 mesh to sort out particles of 37–63 μm in diameter. These classified cross-linked polymers were used as a filler in chromatography for the resolution of DL-mandelic acid. Used for liquid feed and detection was Shimazu LC-4A type high speed liquid chromatography unit, under the following conditions.

Column: 16.7 mm in inside diameter, 500 mm in length
Eluent: a 4:1 mixture of toluene and dioxane
Flow rate: 2 ml/min
Temperature: 10° C.
Detection: a differential refractometer
Sampling amount: 100 mg Given in Table 2 below are the results of measurement on the retention time of D- and L-mandelic acids.

TABLE 2

| | Retention time (min) | |
|---|---|---|
| | D-mandelic acid | L-mandelic acid |
| Before acetylation | 50.095 | 49.873 |
| After acetylation | 62.778 | 61.187 |

From Table 2, it is appreciated that both of the adsorbent can strongly adsorb D-form.

In FIG. 1, there is shown the results of the measurement of specific rotation of each fraction obtained with the use of a fraction collector in the case of the cross-linked polymer of Example 4 (using a polarimeter DIP-140 (Nihon Bunko). The fractionation rate was one fraction per minute. Since L-mandelic acid shows a positive specific rotary power, it will be seen from the FIG. 1 that the L-form is eluted before D-form which is more strongly bound to the adsorbent of this invention. The difference in adsorptivety (difference in elution rate) is thus utilized for the separation into L and D forms.

EXAMPLE 17

Figure 2:
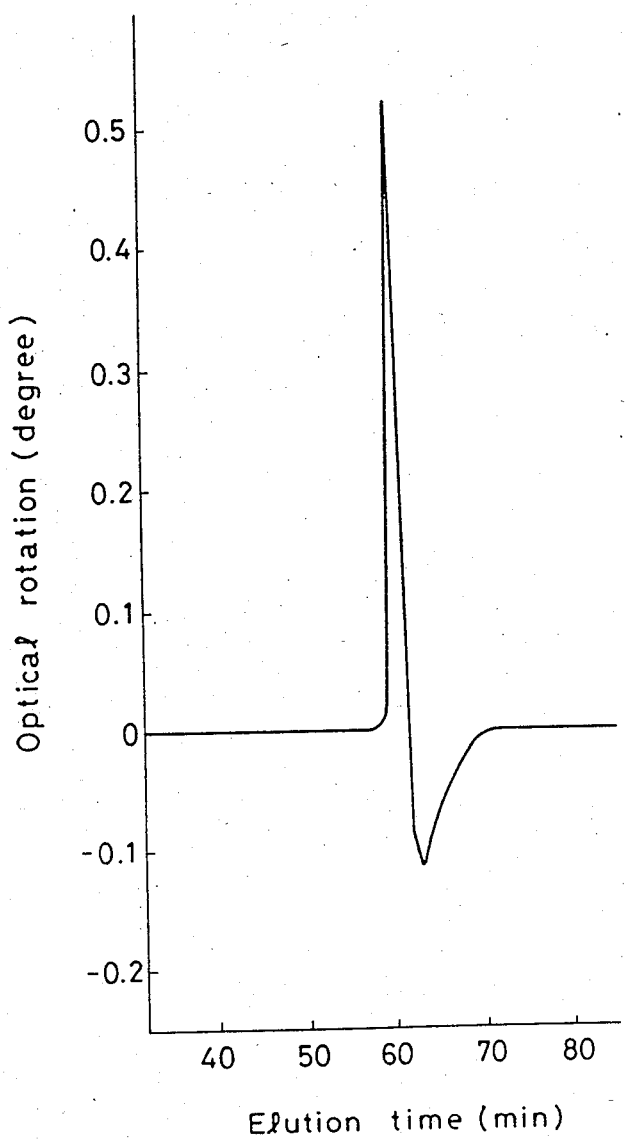
FIG. 2 is a graph showing the results of column chromatography in accordance with the present invention, in which the abscissa and the ordinate indicate elution time and optical rotation, respectively.

Example 16 was repeated in the same manner as described except that the polarimeter DIP-140 was replaced by a flow-cell type polarimeter DIP-181C (Nihon Bunko) connected directly to the column. The results are shown in FIG. 2. From FIG. 2, it will be seen that L-form having a positive optical rotation was eluted at an early state of chromatography while the D-form was eluted at a later stage. Similar experiments were conducted using various racemic mixtures. It was revealed that racemic mixtures of chlorosalidone, pantoylactone, hydantoin derivatives and N-carbobenzoxy or N-benzoyl derivatives of amino acids such as phenylalanine, valine, leucine, tryptophan, serine and methionine were able to be effectively resolved by the cross-linked, polymeric material of this invention.

EXAMPLE 18

The cross-linked polymer obtained in Example 10 was classified to collect particles with a size of 20–40 μm. The resolution of DL-mandelic acid was carried out in the same manner as that in Example 16 with the use of the classified, cross-linked polymer. The specific rotation of the initial fraction was −98 while that of the final one was 60. The adsorbent adsorbs the L-form so that the D-form is eluted before the L-form. Thus, the adsorptivity of the D and L-forms is contrary to that in Example 16. This indicates that the adsorption properties of the adsorbent of this invention can be varied by varying the kind of the poly(amino acid).

EXAMPLE 19

The resolution of DL-mandelic acid was carried out in the same manner as that in Example 16 using the cross-linked polymer obtained in Example 7. A phosphoric acid buffer solution of pH 4 was used as an eluent. The specific rotary power was −55 in the initial fraction and 48 in the final fraction.

EXAMPLE 20

The adsorptivity of bovine serum albumin (hereinafter referred to as BSA) was examined using the cross-linked polymers obtained in Example 6 and Comparative Example 1.

Thus, BSA (25 mg) was dissolved in 25 ml of a phosphoric acid buffer solution of pH 5, to which were mixed 5 g of the cross-linked polymer. The mixture was agitated for a day, followed by filtration of the polymer. The concentration of BSA in the filtrate was measured based on the absorption at 280 nm. The adsorptivity of BSA was 95.9% in the case of the polymer of Example 6 and 20.2% in the case of the polymer of Comparative Example 1. The measurement was effected with Hitachi 200-20 type spectrometer.

EXAMPLE 21

The adsorptivity of copper ion was examined with the cross-linked polymers obtained in Examples 7 and 8 and Comparative Example 1.

Thus, 100 mg of cupric chloride were dissolved in 25 ml of an acetic acid buffer solution of pH 4.5, to which were added 5 g of the cross-linked polymer. After agitation for a day, the polymer was filtered off. The concentration of copper ion in the filtrate was measured by titration with EDTA, The adsorptivity of copper ion was 98.5% in the case of the polymer of Example 7, 98.3% in the case of the polymer of Example 8 and 5.7% in the case of the polymer of Comparative Example 1.

EXAMPLE 22

The cross-linked polymers obtained before and after the acetylation of the terminal amino group in Example 13 were classified by metal sieves of 250 and 400 mesh to sort out particles of 37-63 μm in diameter. These classified cross-linked polymers were used as a filler in chromatography to measure the retention time for D- and L-mandelic acids. Used for liquid feed and detection was Shimazu LC-4 type high speed liquid chromatography unit, under the following conditions.

Column: 16.7 mm in inside diameter, 500 mm in length
Eluent: a 4:1 mixture of toluene and dioxane
Flow rate: 2 ml/min
Temperature: 10° C.
Detection: a differential refractometer
Sampling amount: 100 mg Given in Table 3 below are the results of measurement on the retention time of D- and L-mandelic acids.

TABLE 3

| | Retention time (min) | |
|---|---|---|
| | D-mandelic acid | L-mandelic acid |
| Before acetylation | 62.78 | 61.19 |
| After acetylation | 61.18 | 59.80 |

Figure 3:
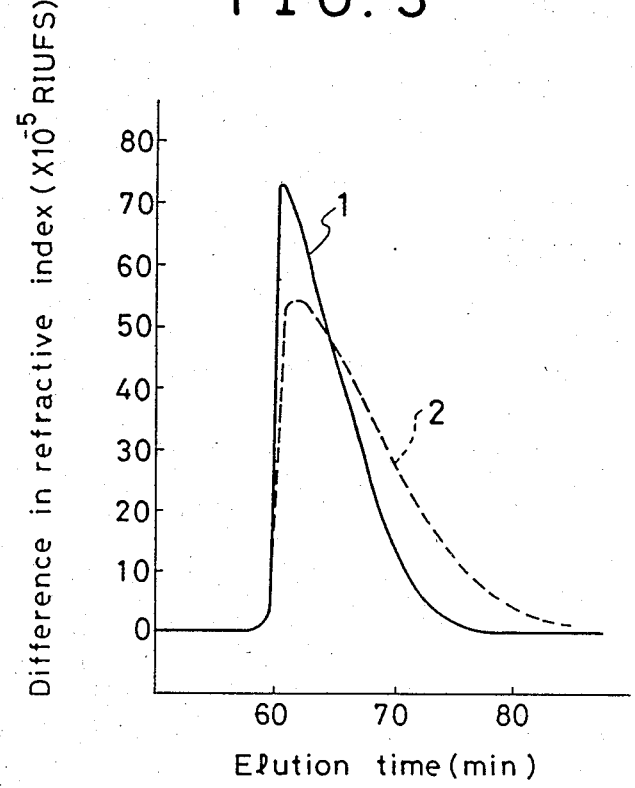
FIG. 3 is a graph showing the results of column chromatography in accordance with the present invention, in which the abscissa and the ordinate indicate elution time and difference in refractive index.

Shown in FIG. 3 is the chromatogram for D-mandelic acid, in which curve 1. is of after acetylation and curve 2 is of before acetylation.

As seen in Table 3, the acetylation of the terminal amino group makes almost no changes in the difference between the retention time of D- and L-types. In addition, the peak of the chromatogram becomes sharper as shown in FIG. 3, with reduced tailing of the peak.

Figure 4:
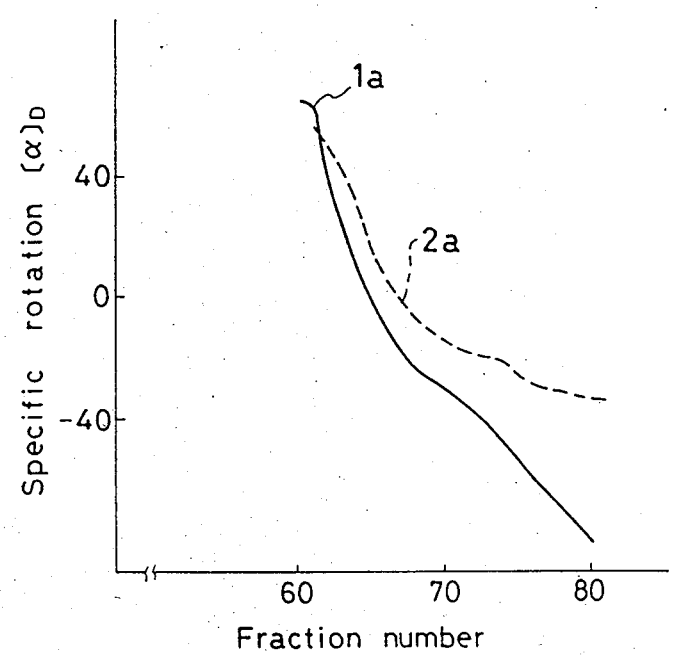
FIG. 4 is a graph, similar to FIG. 1, showing the results of chromatography in accordance with the present invention.

FIG. 4 shows the results of measurement (by DIP type polarimeter of Nihon Bunko) of specific rotation of the respective fractions in resolution of racemic mixture of DL-mandelic acid using the cross-linked polymer, taking one fraction per minute, in which curve 1a is of after acetylation and curve 2a is of before acetylation.

This adsorbent has a strong adsorptive power on D-type, so that L-type is firstly eluted as reflected by (+) optical rotation, and then D-type is eluted as reflected by (−) optical rotation.

It is also seen from FIG. 4 that, by acetylation of the amino terminal, L-mandelic acid of a higher purity is eluted in the initial fraction, while D-mandelic acid of a higher purity is eluted in the final fraction.

This indicates that the tailing of the peak is minimized and that overlapping of peaks of D- and L-types is reduced by acetylation of the terminal amino group, permitting efficient separation of D- and L-types form DL-mixture.

EXAMPLE 23

The cross-linked polymers obtained before and after benzoylation of the terminal in Example 14, were respectively classified to sort out the sizes of 20–40 μm. These classified polymers were used for resolution and separation of DL-mandelic acid in the same manner as in Example 22 except that the column temperature was at 25° C. In the case of the cross-linked polymer without benzoylation of the terminal amino group, only 15.6 mg out of 100 mg of introduced sample was recovered, with the remainder being adsorbed on the polymer. Accordingly, it was impossible to measure the specific rotary power of the respective fractions obtained.

In the case of the cross-linked polymer which had the terminal amino group benzoylated, it was possible to recover all of the introduced sample, of which the initial and final fractions had specific rotation of −45 and 32, respectively.

This adsorbent had a stronger adsorptive action on L-type, so that D-type was eluted prior to L-type.

As clear from the foregoing results, the adsorbent with the benzoylated terminal amino group can perform the resolution and recovery of DL-mandelic acid more efficiently and is found to be a very useful adsorptive separator.

The following references, which are referred to for their disclosures at various points in this application, are incorporated herein by reference.

Japanese Provisioal Publication No. 51-26997 (1976. 3. 5)

M. Goodman, BIOPOLYMERS vol.15 p.1869 (1976)

R. B. Marrierfield, J.A.C.S. vol.98 p.7357 (1976)

J. K. Inman, Biochemistry, vol 8, p.4074 (1969)

J. Kalal, Die Angew. Maklomol. Chem., vol.63, p.23 (1973)

I claim:

1. A cross-linked, polymeric material comprising an optically active, synthetic poly(amino acid) represented by the general formula (I):

wherein R stands for an organic group, R' stands for hydrogen or an alkyl group and n is an integer of at least 5, and a terminal amino group protected as shown by the general formula (II):

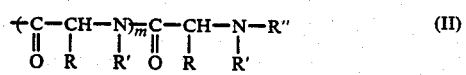

wherein R, R' each has the same meaning as above, R" stands for an organic group and m is an integer of at least 4, said polymeric material obtained by a process including the steps of:

providing an amino group-containing, cross-linked polymer carrier in porous form, polymerizing an N-carboxy anhydride represented by the general formula:

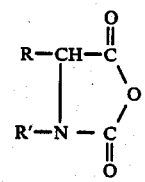

wherein R and R' each have the same meaning as above, in the presence of said carrier serving as an initiator to form a poly(amino acid) supported on said carrier and having terminal amino groups, and protecting the terminal amino groups with an organic group.

2. An adsorbent formed of a cross-linked, polymeric material as defined in claim 1.

3. A method of producing a cross-linked polymeric material comprising an optically active, synthetic poly(amino acid) represented by the general formula (I):

wherein R stands for an organic group, R' stands for hydrogen or an alkyl group and n is an integer of at least 5, including the steps of:

polymerizing an N-carboxy anhydride represented by the general formula:

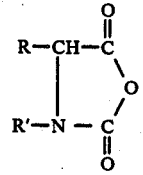

wherein R and R' each have the same meaning as above, in the presence of an initiator to form a poly(amino acid), and reacting said poly(amino acid) with a cross-linked polymer carrier in porous form so that said poly(amino acid) is supported on said carrier.

* * * * *